United States Patent
Nakagawa et al.

(10) Patent No.: US 8,326,562 B2
(45) Date of Patent: *Dec. 4, 2012

(54) INFORMATION MANAGEMENT SYSTEM FOR DRIVE APPARATUS AND METHOD OF MANUFACTURING DRIVE APPARATUS

(75) Inventors: Yoshinari Nakagawa, Isshiki (JP); Tomoo Atarashi, Kariya (JP); Tatsuya Kondo, Okazaki (JP); Masakazu Sato, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 317 days.

This patent is subject to a terminal disclaimer.

(21) Appl. No.: 12/656,238

(22) Filed: Jan. 21, 2010

(65) Prior Publication Data

US 2010/0250181 A1     Sep. 30, 2010

(30) Foreign Application Priority Data

Mar. 31, 2009   (JP) .................................. 2009-087926

(51) Int. Cl.
G06F 19/00 (2011.01)
H02P 6/00 (2006.01)

(52) U.S. Cl. ..................................... 702/94; 318/400.16

(58) Field of Classification Search .................... 702/33, 702/94, 105; 318/400.04, 400.16, 632
See application file for complete search history.

(56) References Cited

U.S. PATENT DOCUMENTS

| | | | |
|---|---|---|---|
| 5,634,448 A | 6/1997 | Shinogle et al. | |
| 6,473,664 B1 | 10/2002 | Lee et al. | |
| 6,494,379 B1 | 12/2002 | Schmitt | |
| 7,973,502 B2 * | 7/2011 | Nakagawa et al. | 318/400.16 |
| 2005/0007056 A1 | 1/2005 | Yamamoto et al. | |
| 2005/0209822 A1 | 9/2005 | Ishiba et al. | |
| 2009/0237018 A1 * | 9/2009 | Nakagawa et al. | 318/400.04 |

FOREIGN PATENT DOCUMENTS

| | | |
|---|---|---|
| JP | A 61-10715 | 1/1986 |
| JP | A 7-332142 | 12/1995 |
| JP | A 10-131802 | 5/1998 |
| JP | A-11-340110 | 12/1999 |
| JP | A-2002-342704 | 11/2002 |
| JP | A-2003-264991 | 9/2003 |
| JP | A-2005-033959 | 2/2005 |
| JP | A 2005-295639 | 10/2005 |
| JP | A-2006-216981 | 8/2006 |
| JP | A-2007-336707 | 12/2007 |
| JP | A-2007-366707 | 12/2007 |

OTHER PUBLICATIONS

International Search Report mailed May 25, 2010 for International Application No. PCT/JP2010/052418 (with translation).
Partial Translation of Sep. 6, 2012 Office Action issued in Japanese Patent Application No. 2009-087926.

* cited by examiner

*Primary Examiner* — Bryan Bui
(74) *Attorney, Agent, or Firm* — Oliff & Berridge, PLC.

(57) ABSTRACT

An information management system includes a storage medium storing position error information of the rotation sensor obtained based on information of the back electromotive force and output information from the rotation sensor in an inspection process in which a back electromotive force is measured by mechanically driving the rotary electrical machine after the rotary electrical machine and the rotation sensor are assembled, wherein the storage medium is provided in a state capable of being read via communication when a control device controlling the rotary electrical machine is assembled with the rotary electrical machine.

18 Claims, 3 Drawing Sheets

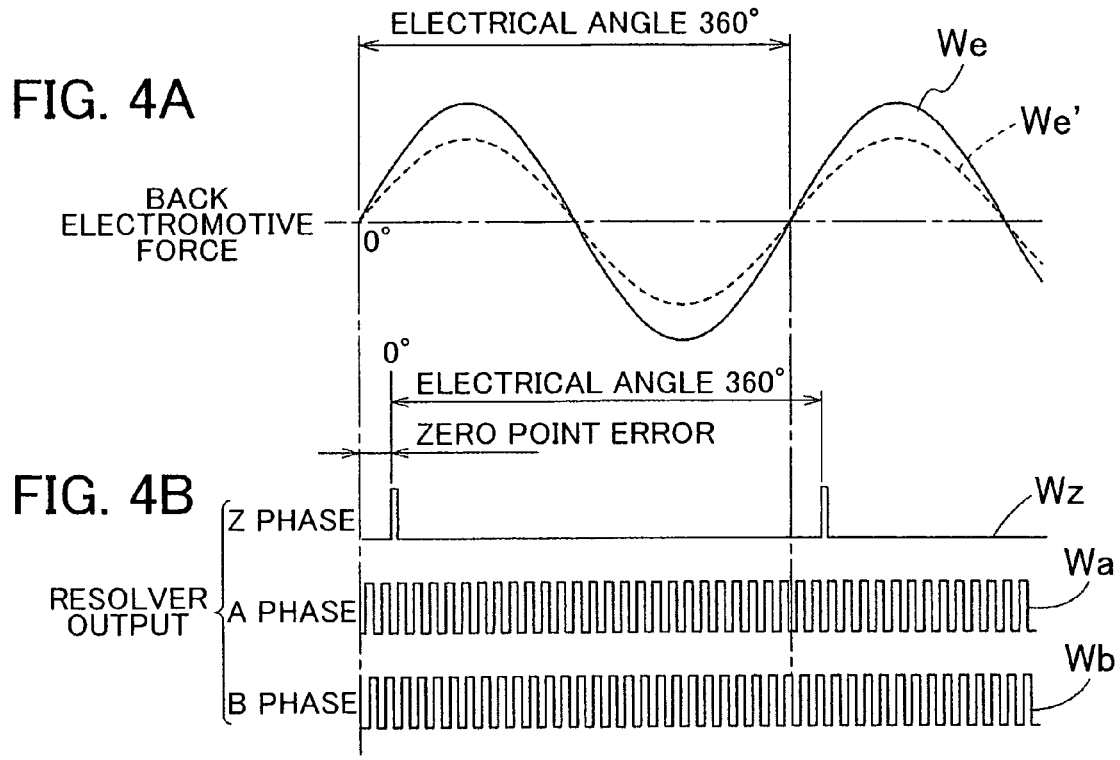
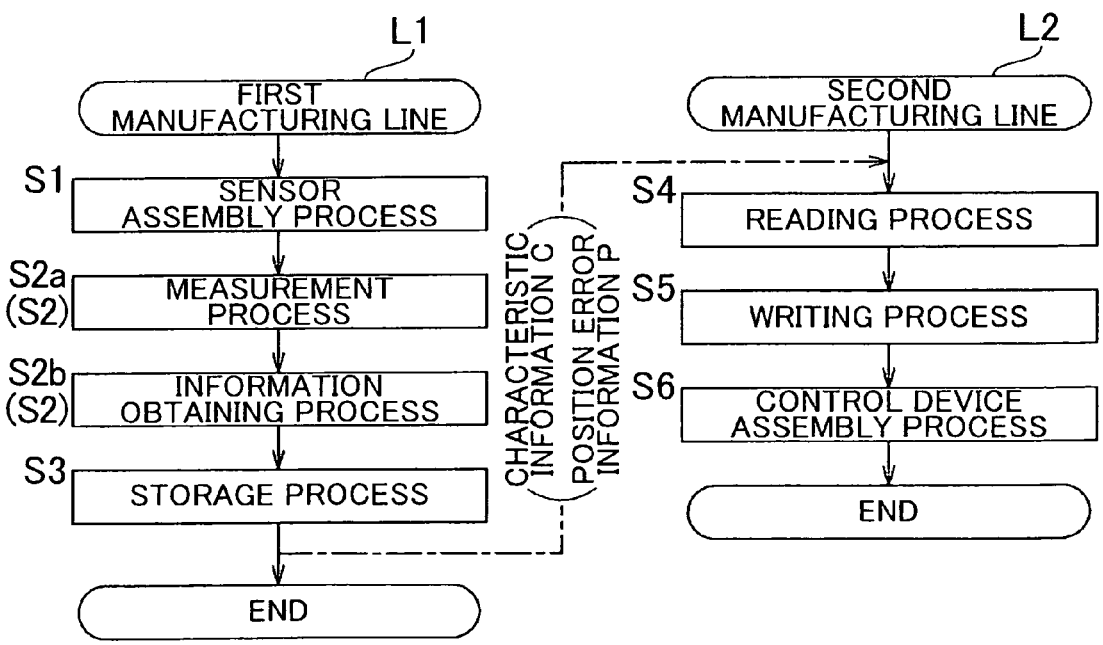

INFORMATION MANAGEMENT SYSTEM FOR DRIVE APPARATUS AND METHOD OF MANUFACTURING DRIVE APPARATUS

INCORPORATION BY REFERENCE

The disclosure of Japanese Patent Application No. 2009-087926 filed on Mar. 31, 2009 including the specification, drawings and abstract is incorporated herein by reference in its entirety.

BACKGROUND

The present invention relates to an information management system for a drive apparatus including a rotary electrical machine and a rotation sensor detecting a rotation position of a rotor of the rotary electrical machine, and a method of manufacturing such a drive apparatus.

A drive apparatus including a rotary electrical machine (motor or generator) is provided with a rotation sensor for precisely detecting a rotation position of a rotor with respect to a stator, so as to perform accurate speed control of the rotary electrical machine. The reason for precisely detecting the rotation position of the rotor by the rotation sensor in this manner is that a current value and a current phase to be input to the rotary electrical machine are determined based on an output signal from the rotation sensor.

When assembling such a drive apparatus, it is quite rare to have absolutely no assembly error between the rotary electrical machine and the rotation sensor by one time of assembly. Due to this assembly error and the like, a phase difference may occur between the rotary electrical machine and the rotation sensor. Here, when paying attention to the phase of a certain region in a circumferential direction of the rotor of the rotary electrical machine, "a phase difference between the rotary electrical machine and the rotation sensor" means a phase difference between a rotation phase of this certain region and a rotation phase of a region of the rotation sensor corresponding to the certain region (the same applies below). Accordingly, for aligning the phases between these regions, it is necessary in general to adjust the phase difference therebetween at least once.

As a method of adjusting the phase difference between the rotary electrical machine and the rotation sensor, Japanese Patent Application Publication No. JP-A-2005-295639 below describes a method of generating a back electromotive force by rotating the rotation shaft of the rotary electrical machine after assembly, comparing a voltage waveform of the rotary electrical machine with a voltage waveform for detection of the rotation sensor, and manually rotating the rotation sensor in a circumferential direction with respect to the rotary electrical machine when the phase difference therebetween is out of a predetermined range. In this method, the above operation is repeated until the phase difference comes within the predetermined range. Further, Japanese Patent Application Publication No. JP-A-S61-10715 below describes a method of measuring an error of the rotation sensor and storing the error in a storage unit of a control device controlling the rotation sensor in advance, and obtaining an accurate position based on the stored error information and detection values detected by the rotation sensor.

SUMMARY

However, when the drive apparatus is manufactured by a method as the one described in Japanese Patent Application Publication No. JP-A-2005-295639, phase adjustment is essentially on manual basis and thus takes a long time and labor. Further, this adjustment also requires that an adjustment mechanism for phase adjustment is attached to the drive apparatus, which causes a problem of cost increase. On the other hand, such problems do not occur when the drive apparatus is manufactured by a method as the one described in Japanese Patent Application Publication No. JP-A-S61-10715. However, in the case where manufacturing the drive apparatus, manufacturing the control device, and further assembling the devices with a vehicle or the like (an example of an apparatus using the drive apparatus) take place in different locations, for example in different processes, different factories, and different companies, special management operations are required for providing one-to-one correspondence between the drive apparatus and the control device storing error information of this drive apparatus when transporting, storing, or the like of the drive apparatus and the control device is performed, thereby causing a problem of high cost.

The present invention is made in view of the above-described problems, and it is an object of the present invention to provide an information management system for a drive apparatus and a method of manufacturing the drive apparatus, which enable to adjust a phase difference between a rotary electrical machine and a rotation sensor simply at low cost.

To achieve the above-described object, an information management system for a drive apparatus including a rotary electrical machine and a rotation sensor detecting a rotation position of a rotor of the rotary electrical machine according to a first aspect of the present invention has a characteristic structure including: a storage medium storing position error information of the rotation sensor obtained in an inspection process in which a back electromotive force is measured by mechanically driving the rotary electrical machine after the rotary electrical machine and the rotation sensor are assembled, based on information of the back electromotive force and output information from the rotation sensor. The storage medium is provided in a state capable of being read via communication when a control device controlling the rotary electrical machine is assembled with the rotary electrical machine.

Here, the "position error information of the rotation sensor" means information related to a phase difference between the rotary electrical machine and the rotation sensor due to, for example, assembly errors when the rotary electrical machine and the rotation sensor are assembled, and/or mechanical errors which the rotary electrical machine and the rotation sensor have.

With this characteristic structure, in the inspection process performed after the rotary electrical machine and the rotation sensor are assembled, operation of the rotary electrical machine is verified from information of the back electromotive force obtained by mechanically driving the rotary electrical machine, and at the same time, the position error information with respect to a combination of the rotary electrical machine and the rotation sensor is obtained based on the information of the back electromotive force and output information from the rotation sensor. Thus, information related to the phase difference between the rotary electrical machine and the rotation sensor can be obtained without requiring a special process. The obtained position error information is stored in the storage medium, and this storage medium is provided in a state capable of being read via communication when the control device is assembled with the rotary electrical machine. Therefore, the position error information of this drive apparatus that becomes necessary when the drive apparatus and the control device are assembled can be obtained easily via communication as necessary. Then the position error information related to the drive apparatus with which the control device is assembled can be written in this control device appropriately without error. Accordingly, when transporting, storing, or the like of the drive apparatus and the control device is performed, there is no need for special management operations to provide one-to-one correspondence between the drive apparatus and the position error information of this drive apparatus or the control device in which this position error information are stored, and thus increase in cost does not happen. The control device can adjust the phase difference between the rotary electrical machine and the rotation sensor electrically based on the position error information written when assembled with the rotary electrical machine. Thus, it is not necessary to mechanically adjust an attachment position of the rotation sensor, which allows reduction of the manufacturing time. An adjustment mechanism is also not necessary, which allows reduction of costs. Therefore, the phase difference between the rotary electrical machine and the rotation sensor can be adjusted simply at low cost.

Here, the position error information may be information of a difference between a reference point of a voltage waveform as the information of the back electromotive force and a reference point of a pulse signal as the output information from the rotation sensor.

With this structure, the position error information related to the phase difference between the rotary electrical machine and the rotation sensor can be obtained easily from a difference between a reference point of a voltage waveform as the information of the back electromotive force and a reference point of a pulse signal as the output information from the rotation sensor.

Further, in the inspection process, characteristic information of the rotary electrical machine may be further obtained based on the information of the back electromotive force when the rotary electrical machine is mechanically driven, and the storage medium may further store the characteristic information.

With this structure, characteristic information of the rotary electrical machine obtained based on the information of the back electromotive force when the rotary electrical machine is mechanically driven in the inspection process is also stored in the storage medium. Therefore, also this characteristic information can be obtained via communication when the drive apparatus and the control device are assembled, and can be written in the control device appropriately without error. Accordingly, the control device can perform more precise control even considering the characteristic of the rotary electrical machine.

Further, in the structure obtaining and storing characteristic information as described above, the inspection process may include a process of measuring an effective value of a voltage waveform as information of the back electromotive force, and the characteristic information of the rotary electrical machine may include information of the effective value of the voltage waveform.

With this structure, in the inspection process, an effective value is further measured based on a voltage waveform as the information of the back electromotive force obtained by mechanically driving the rotary electrical machine, and information of this effective value is stored as a type of characteristic information of the rotary electrical machine in the storage medium. When information of the effective value is thus obtained as characteristic information, use of the information of the effective value allows more precise control of the rotary electrical machine even when the rotary electrical machines have individually different characteristics.

Further, the information management system may further include an information management server including the storage medium, in which the information management server may be structured to be capable of communicating with a control information writing device which writes the position error information in the control device when the control device is assembled with the rotary electrical machine, and the storage medium may be in a state capable of being read by the control information writing device via communication.

With this structure, information such as the position error information stored in the storage medium can be managed appropriately, and the control information writing device can obtain the position error information and the like easily as necessary when the control device is assembled with the rotary electrical machine. Therefore, the position error information related to the drive apparatus with which the control device is assembled can be written in this control device appropriately without error, and the phase difference between the rotary electrical machine and the rotation sensor can be adjusted simply at low cost.

Further, the information management server may be further structured to be capable of communicating with an inspection device which performs the inspection process, and the position error information obtained by the inspection device may be capable of being written into the storage medium via communication.

With this structure, the position error information obtained by the inspection device when the inspection process is performed can be stored in the storage medium easily and appropriately. Therefore, also in the inspection process, an operation of managing the position error information with respect to a combination of the rotary electrical machine and the rotation sensor becomes simple, which allows further cost reduction.

A method of manufacturing a drive apparatus including a rotary electrical machine and a rotation sensor detecting a rotation position of a rotor of the rotary electrical machine according to a second aspect of the present invention has a characteristic structure including: first assembling the rotary electrical machine with the rotation sensor; measuring a back electromotive force by mechanically driving the rotary electrical machine; obtaining position error information of the rotation sensor based on information of the back electromotive force and output information from the rotation sensor; storing the position error information in a storage medium; reading the position error information from the storage medium via communication; writing the position error information read in the reading in a control device which controls the rotary electrical machine; and second assembling the control device with the rotary electrical machine.

With this characteristic structure, in the inspection process performed after the first assembling, operation of the rotary electrical machine is verified from information of the back electromotive force obtained by mechanically driving the rotary electrical machine, and at the same time, the position error information with respect to a combination of the rotary electrical machine and the rotation sensor is obtained in the obtaining based on the information of the back electromotive force and output information from the rotation sensor. Thus, a process for obtaining the phase difference can be performed by calculation, and information related to the phase difference between the rotary electrical machine and the rotation sensor can be obtained without requiring a special operation process. The obtained position error information is stored in the storage medium in the storing. Then the position error information stored in the storage medium is read from the storage medium via communication in the reading and is written in the control device in the writing, and this control device is assembled with the drive apparatus in the second assembling. Therefore, the position error information of this drive apparatus that becomes necessary when the drive apparatus and the control device are assembled can be obtained via communication as necessary, and can be written in the control device appropriately without error, and the drive apparatus is manufactured with this control device. Accordingly, when transporting, storing, or the like of the drive apparatus and the control device is performed, there is no need for special management operations to provide one-to-one correspondence between the drive apparatus and the position error information of this drive apparatus or the control device in which the position error information are stored, and thus increase in cost does not happen. The control device can adjust the phase difference between the rotary electrical machine and the rotation sensor electrically based on the position error information written when assembled with the rotary electrical machine. Thus, it is not necessary to mechanically adjust an attachment position of the rotation sensor, which allows reduction of the manufacturing time. An adjustment mechanism is also not necessary, which allows reduction of costs. Therefore, the phase difference between the rotary electrical machine and the rotation sensor can be adjusted simply at low cost, so as to manufacture the drive apparatus.

BRIEF DESCRIPTION OF THE DRAWINGS

FIGS. 4A and 4B show explanatory charts for describing a method of obtaining position error information of the rotation sensor; and FIG. 5 is a process chart of a method of manufacturing the drive apparatus according to the embodiment of the present invention.

DETAILED DESCRIPTION OF EMBODIMENTS

Figure 1:
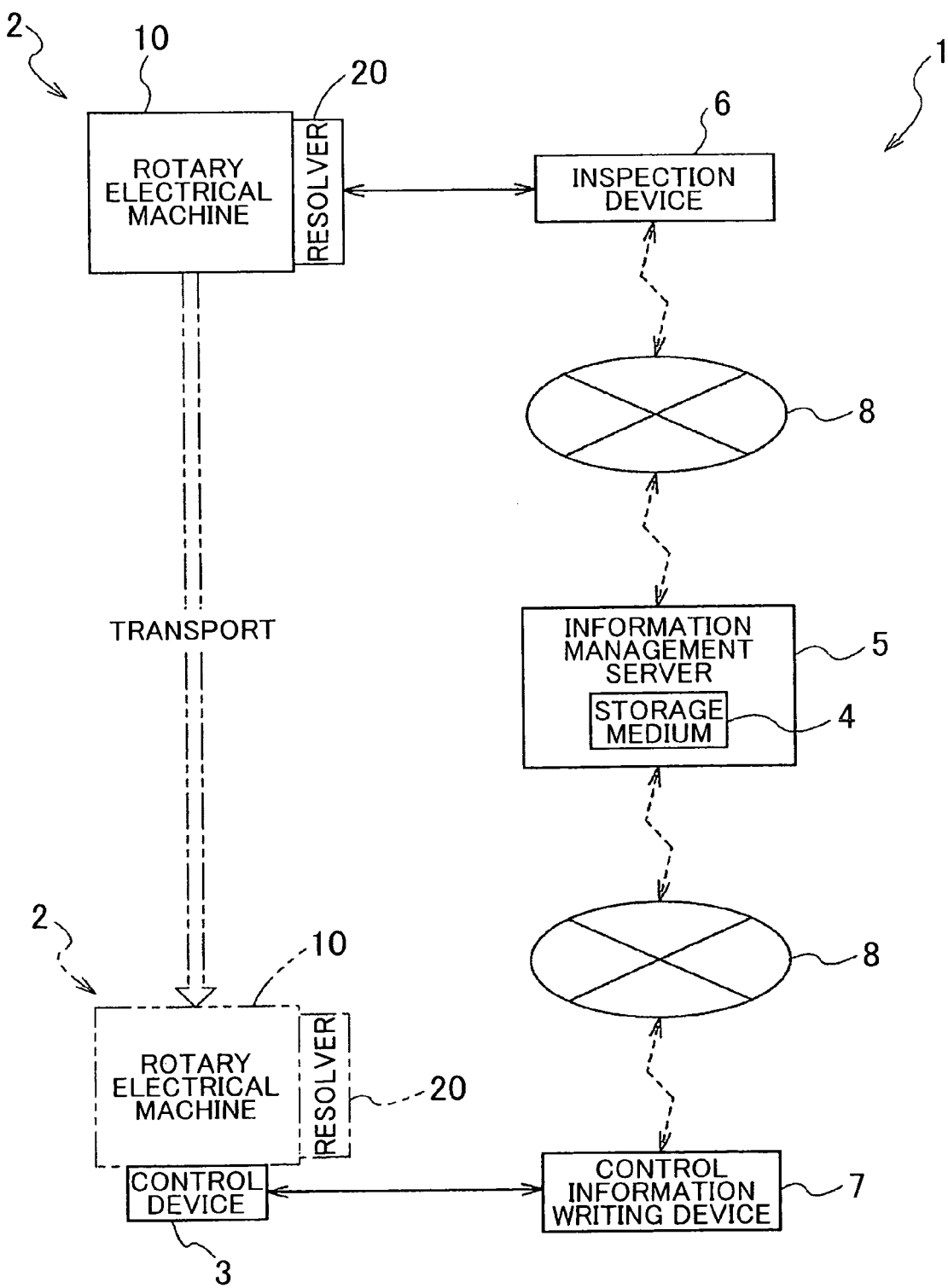
FIG. 1 is a block diagram showing a schematic structure of an information management system of a drive apparatus according to an embodiment of the present invention.

Hereinafter, an embodiment of an information management system 1 of a drive apparatus 2 according to the present invention will be described with reference to the drawings. In this embodiment, by way of example, the case where the drive apparatus 2 is a drive apparatus for a hybrid vehicle including a rotary electrical machine 10 will be described. This drive apparatus 2 includes a rotary electrical machine 10 and a resolver 20 detecting a rotation position of a rotor 11 of the rotary electrical machine 10. The rotary electrical machine 10 is capable of outputting a driving force under control by a control device 3. Here, when assembling the rotary electrical machine 10 with the resolver 20, a given phase difference occurs therebetween. However, the drive apparatus 2 according to this embodiment is structured such that the phase difference is adjusted after being integrated with the control device 3, using position error information P obtained in an inspection process S2 (see FIG. 5) performed thereafter. At this point, the position error information P is stored in a storage medium 4, and is managed by an information management system 1 in a state that the storage medium 4 is capable of being read via communication when the control device 3 is assembled with the rotary electrical machine 10. When manufacturing the drive apparatus 2 according to this embodiment, use of such an information management system 1 enables simple and low cost adjustment of the phase difference between the rotary electrical machine 10 and the resolver 20. Hereinafter, a structure of the drive apparatus 2 according to this embodiment will be described briefly, and thereafter a structure of the information management system 1 according to this embodiment and a method of manufacturing the drive apparatus 2 using the position error information P managed via the information management system 1 will be described in detail.

1. Structure of the Drive Apparatus

Figure 2:
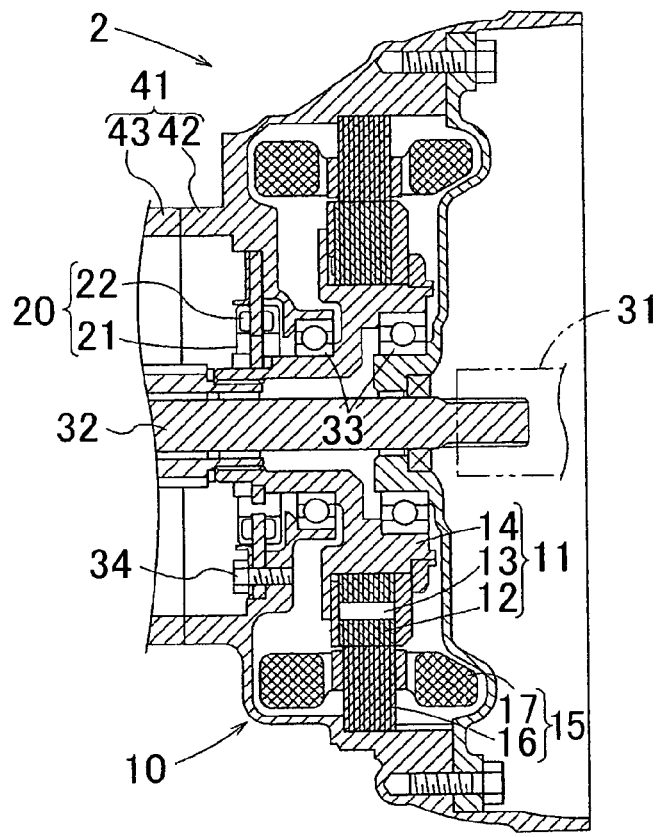
FIG. 2 is a partial cross-sectional view of the drive apparatus including a rotary electrical machine and a rotation sensor.

First, a structure of the drive apparatus 2 will be described. As shown in FIG. 2, the drive apparatus 2 includes an input shaft 32 integrally coupled to an engine output shaft 31 such as a crank shaft outputting rotation of an engine (not shown), the rotary electrical machine 10 disposed surrounding the input shaft 32, and the resolver 20, which are housed in a drive apparatus case 41. In addition, the drive apparatus case 41 includes a rotary electrical machine housing case 42 and a main body case 43, where the rotary electrical machine housing case 42 houses the rotary electrical machine 10 and the resolver 20, and the main body case 43 houses a transmission (not shown). The control device 3 including an inverter is further connected to the drive apparatus 2 (see FIG. 1), and a rotational driving force of the engine and a rotational driving force of the rotary electrical machine 10 driven under control by the control device 3 are transmitted to driving wheels via a not-shown speed change mechanism, a counter gear mechanism, a differential gear mechanism, and so on. Thus, the hybrid vehicle including the drive apparatus 2 is enabled to travel.

As shown in FIG. 2, the rotary electrical machine 10 includes a rotor 11 fixed to the input shaft 32 connected integrally to the engine output shaft 31 and disposed to be rotatable about an axial center of the input shaft 32, and a stator 15 arranged coaxially with the rotor 11 on the outside in a radial direction of the rotor 11 and fixed to the rotary electrical machine housing case 42. The rotor 11 includes a rotor core 12, permanent magnets 13 disposed at plural positions in a circumferential direction of the rotor core 12, and a rotor support member 14 fixing and supporting these components. A bearing 33 is provided between the rotor support member 14 and the rotary electrical machine housing case 42. The rotor 11 is supported by the bearing 33 rotatably with respect to the rotary electrical machine housing case 42. The stator 15 includes a stator core 16 and a coil 17 wound on the stator core 16. Such a rotary electrical machine 10 is capable of serving a function as a motor (electrical motor) which is supplied with electric power to generate motive power and a function as a generator (electric generator) which is supplied with motive power to generate electric power. Specifically, the rotary electrical machine 10 functions as a motor to generate a driving force for the vehicle to travel when the vehicle starts to travel, accelerates, or the like, and functions as a generator during a regeneration braking or the like for decelerating the vehicle.

The resolver 20 is disposed adjacent to the rotor 11 of the rotary electrical machine 10. The resolver 20 is provided for precisely detecting the rotation position and the rotation speed of the rotor 11 with respect to the stator 15 of the rotary electrical machine 10. In this embodiment, this resolver 20 corresponds to a "rotation sensor" according to the present invention. The resolver 20 includes a sensor rotor 21 and a sensor stator 22. The sensor rotor 21 is attached integrally to the rotor support member 14, and rotates integrally with the rotor 11 of the rotary electrical machine 10. The sensor stator 22 is arranged coaxially with the sensor rotor 21 on the outside in the radial direction of the sensor rotor 21, and is fixed to the rotary electrical machine housing case 42 with a bolt 34.

An output signal from the resolver 20 is converted into a three-phase output signal by an R/D converter (resolver/digital converter, not shown), namely, an A phase signal, a B phase signal, and a Z phase signal. As shown in FIG. 4B, in the Z phase signal, there is obtained a Z phase pulse waveform Wz in which a rectangular pulse signal occurs every one rotation of the sensor rotor 21 of the resolver 20. Further, in the A phase signal and the B phase signal, there are obtained an A phase pulse waveform Wa and a B phase pulse waveform Wb, in which rectangular pulse signals occur at quite short predetermined cycles with a predetermined phase difference from each other. In the pulse waveforms obtained in this manner, an electrical angle of the resolver 20 is set on the basis (zero point) of a rising point of the Z phase pulse waveform Wz. Specifically, the electrical angle is set with a rising point of one pulse signal in the Z phase signal being "0°", and a rising point of the pulse signal subsequent to this one pulse signal being "360°". The A phase signal and the B phase signal are set to include a predetermined number of pulse signals in one cycle (from an electrical angle 0° to an electrical angle 360°) of the Z phase signal. Thus, by measuring the number of pulse signals in A phase and B phase which appear from the reference point (zero point) of the Z phase signal to each time point, the rotation position (electrical angle) thereof can be obtained. In this example, A phase signals and B phase signals with 1024 pulses are included in one cycle of the Z phase signal. In this example, if A phase signals and B phase signals with just n pulses appear from the reference point (zero point) of the Z phase signal to a certain time point, the rotation position at this point is the rotation position (rotation phase) corresponding to an electrical angle "(360°/1024)×n". Since the A phase signal and the B phase signal have a predetermined phase difference, the rotational direction of the rotor 11 of the rotary electrical machine 10 can be determined based on the order of outputting these signals.

2. Structure of the Information Management System

Next, a structure of the information management system 1 according to this embodiment will be described. As shown in FIG. 1, the information management system 1 according to this embodiment includes an inspection device 6, an information management server 5, and a control information writing device 7. The system is structured to allow information exchange between the inspection device 6 and the information management server 5 and between the information management server 5 and the control information writing device 7 via communication with each other. In this embodiment, an example will be described in which the above server and devices are connected communicably via a communication network 8. That is, this information management system 1 includes the communication network 8 as a communication unit, and is structured such that the inspection device 6 and the control information writing device 7 are capable of reading/writing information from/to the storage medium 4 via this network.

The inspection device 6 is a device for carrying out the inspection process S2 (see FIG. 5). As will be described later, in this embodiment, position error information P of the resolver 20 is obtained in the inspection process S2 based on information of a back electromotive force obtained by mechanically driving the rotary electrical machine 10 and output information from the resolver 20. Further, characteristic information C of the rotary electrical machine 10 is obtained based on information of a back electromotive force obtained by mechanically driving the rotary electrical machine 10. Therefore, the inspection device 6 includes, for example, a measuring device for measuring a back electromotive force, a detector for detecting an output signal from the resolver 20, an arithmetic unit for performing calculation based on information of a back electromotive force and the output signal from the resolver 20 so as to derive the position error information P, and so on. In this embodiment, the inspection device 6 is connected to the information management server 5 via the communication network 8, and the inspection device 6 and the information management server 5 are capable of communicating with each other. Thus, the position error information P and the characteristic information C obtained by the inspection device 6 are in a state of being communicable to the information management server 5 via the communication network 8. In addition, it is preferred that the inspection device 6 be structured to further include an arithmetic processing device that functions as a client computer, and perform information communication with a host computer included in the information management server 5.

Figure 3:
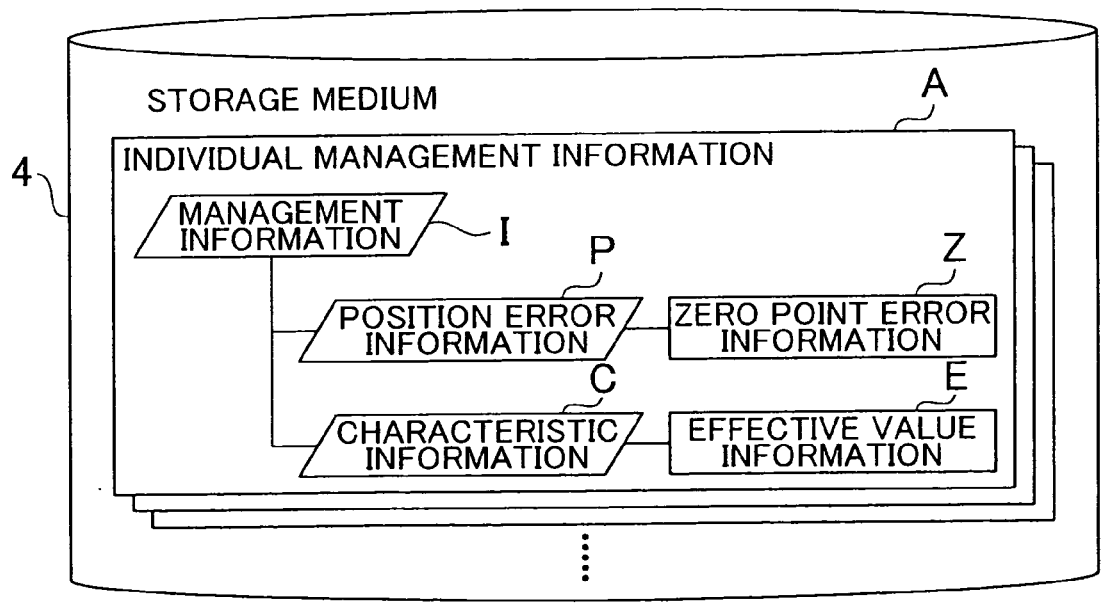
FIG. 3 is a diagram showing an example of information stored in a storage medium.

The information management server 5 is a device for storing and managing the position error information P and the characteristic information C, and exchanging these information with the inspection device 6 and the control information writing device 7 as necessary. In this embodiment, the information management server 5 includes the storage medium 4 capable of storing information, and an arithmetic processing unit that functions as a host computer. As such a storage medium 4 for managing information, a device capable of storing and being rewritten information, such as a hard disk drive, a flash memory, and/or the like can be used preferably. Then, the position error information P and the characteristic information C communicated to the inspection device 6 via the communication network 8 can be written in the storage medium 4. Here, as conceptually shown in FIG. 3, the storage medium 4 stores individual management information A related to one or more drive apparatuses 2 in the form of a database. In this embodiment, each piece of the individual management information A includes management information I, position error information P, and characteristic information C.

The management information I includes identification codes of the rotary electrical machine 10 included in the drive apparatus 2. Such management information I is necessary for managing manufacturing processes of the rotary electrical machine 10. The position error information P and the characteristic information C are obtained in the inspection process S2 (see FIG. 5), which will be described later, based on information of a back electromotive force obtained by mechanically driving the rotary electrical machine 10, and so on. Note that the inspection process S2 is performed after the rotary electrical machine 10 and the resolver 20 are assembled. More specifically, the position error information P is difference information between a reference point (zero point) of a voltage waveform We as information of a back electromotive force and a reference point (zero point) of a pulse signal as output information from the resolver 20, that is, zero point error information Z (see FIG. 3) regarding zero point errors between voltage waveforms We and pulse signals (see FIGS. 4A and 4B). Further, the characteristic information C includes effective value information E related to effective values of voltage waveforms We as information of a back electromotive force. Details will be described later with a method of manufacturing the drive apparatus 2. These position error information P and the characteristic information C are stored in a manner associated with identification codes of respective rotary electrical machines 10 included in drive apparatuses 2 by the management information I.

Further, in this embodiment, the information management server 5 is connected to the control information writing device 7 via the communication network 8, whereby the information management server 5 and the control information writing device 7 can communicate with each other. Thus, the position error information P and the characteristic information C stored and managed in the storage medium 4 of the information management server 5 are capable of being read from the control information writing device 7 via communication.

The control information writing device 7 carries out a writing process S5 (see FIG. 5). The control information writing device 7 writes the position error information P and the characteristic information C to the control device 3 when assembling the control device 3 with the rotary electrical machine 10. The control information writing device 7 includes, for example, an arithmetic processing device functioning as a client computer, a writer for writing information in the control device 3, and so on. The client computer accesses the information management server 5 as necessary, and based on the management information I (including identification codes) related to the individual management information A and an identification code related to the rotary electrical machine 10 included in a desired drive apparatus 2, the client computer obtains the individual management information A related to this drive apparatus 2. The writer writes the position error information P and the characteristic information C included in the obtained individual management information A in a storage medium, such as a RAM or ROM, included in the control device 3.

As described above, the system is structured to allow information exchange between the inspection device 6 and the information management server 5 and between the information management server 5 and the control information writing device 7 via the communication network 8 with each other. Here, as a communication method via the communication network 8, either of wired communication and wireless communication may be adopted. When adopting a wired communication method, a publicly known wired communication network constituted of telephone lines, power lines, optical cables, and/or the like for example may be used. Further, when adopting a wired communication method, a publicly known wireless communication network such as a mobile telephone network, a wireless LAN (Local Area Network), or the like may be used for example. In addition, wired communication and wireless communication may be used in combination. In this information management system 1, the inspection device 6, the information management server 5, and the control information writing device 7 may be placed in different locations from each other (such as different operation lines, different factories, different companies).

3. Method of Manufacturing the Drive Apparatus

Next, an overview of a method of manufacturing the drive apparatus 2 according to this embodiment will be described. As shown in FIG. 5, the drive apparatus 2 according to this embodiment is manufactured through manufacturing processes on a first manufacturing line L1, and manufacturing processes on a second manufacturing line L2 placed in a different location from the first manufacturing line L1. On the first manufacturing line L1, a sensor assembly process S1, an inspection process S2, and a storage process S3 are performed. On the other hand, on the second manufacturing line L2, a reading process S4, a writing process S5, and a control device assembly process S6 are performed. In this embodiment, the sensor assembly process S1 corresponds to a "first assembly process" according to the present invention, and the control device assembly process S6 corresponds to a "second assembly process" according to the present invention. The information management system 1 intervenes between the manufacturing processes on the first manufacturing line L1 and the manufacturing processes on the second manufacturing line L2, appropriately manages the individual management information A related to one or more drive apparatuses 2 individually, and provides, in response to a request from the control information writing device 7, the control information writing device 7 with the individual management information A corresponding to this request.

3-1. Manufacturing Processes on the First Manufacturing Line

The manufacturing processes on the first manufacturing line L1 are mainly for assembling the drive apparatus 2. In the sensor assembly process S1, the rotary electrical machine 10 and the resolver 20 are assembled. The rotary electrical machine 10 and the resolver 20 are assembled using a publicly known method so that the center axes thereof substantially match, and positions of respective zero points (where the electrical angle turns to 0°), which will be described later, as reference points of the rotary electrical machine 10 and the resolver 20 become substantially equal. In this stage, the zero point positions of the rotary electrical machine 10 and the resolver 20 are substantially equal but do not match completely, and are in a state of having given assembly errors. Further, the rotary electrical machine 10 and the resolver 20 each have an intrinsic mechanical error due to reasons such as having a slight unevenness related to the arrangement of the permanent magnets 13 and the coil 17. Thus, due to the assembly errors and the mechanical errors, a phase difference occurs between the rotary electrical machine 10 and the resolver 20. Accordingly, an operation to adjust the phase difference is necessary for enabling accurate rotation speed control of the rotary electrical machine 10 by precisely detecting the rotation position of the rotor 11 with respect to the stator 15 of the rotary electrical machine 10. In this embodiment, a method to adjust the phase difference as will be described below is adopted, rather than performing a mechanical adjustment operation such as rotating the resolver 20 in a circumferential direction with respect to the rotary electrical machine 10 while continuously checking the phase difference.

In the inspection process S2, using the inspection device 6, position error information P of the resolver 20 is obtained based on information of a back electromotive force obtained by mechanically driving the rotary electrical machine 10 and output information from the resolver 20. Measurement of a back electromotive force is an inspection item that is usually performed for verifying that the rotary electrical machine 10 and the resolver 20 operate normally after assembly, and is not a special process added for obtaining the phase difference. The inspection process S2 has a measurement process S2a and an information obtaining process S2b.

In the measurement process S2a, a back electromotive force is measured by mechanically driving the rotary electrical machine 10, thereby obtaining information of the back electromotive force. Here, as the information of the back electromotive force, the voltage waveform We having a sinusoidal wave shape as shown by a solid line in FIG. 4A is obtained. In the voltage waveform We thus obtained, an electrical angle of the rotary electrical machine 10 is set with zero cross points being reference points (zero points). Specifically, the electrical angle is set with one zero cross point being "0°" and a zero cross point at a time point elapsed by one wavelength from the zero cross point being "360°". In the measurement process S2a, output information from the resolver 20 is further obtained. Here, as the output information from the resolver 20, at least the Z phase pulse waveform Wz and the A phase pulse waveform Wa as described above are obtained (see FIG. 4B).

In the information obtaining process S2b, position error information P of the resolver 20 is obtained based on the information of the back electromotive force obtained in the inspection process S2 and output information from the resolver 20. As described above, the voltage waveform We obtained as the information of the back electromotive force and the Z phase pulse waveform Wz obtained as output information from the resolver 20 each have a reference point (zero point) where the electrical angle becomes 0°. In this embodiment, the difference (differential amount) between these reference points (zero points) is assumed as an error, and the zero point error information Z regarding this difference (differential amount) is obtained as the position error information P. Specifically, as the zero point error information Z, that is, the position error information P, there is obtained information of the phase difference corresponding to the number of pulse signals (or the magnitude of an electrical angle corresponding thereto) of the A phase pulse waveform Wa that appears between the zero point of the voltage waveform We having a sinusoidal wave shape from the rotary electrical machine 10 and the zero point of the Z phase pulse waveform Wz from the resolver 20.

In this embodiment, in the information obtaining process S2b, moreover, characteristic information C of the rotary electrical machine 10 is obtained based on the voltage waveform We as the information of the back electromotive force when the rotary electrical machine 10 is driven mechanically. Specifically, based on the voltage waveform We as the information of the back electromotive force, effective values thereof are measured, and the characteristic information C is obtained as information including the effective value information E related to the effective values of the voltage waveform We. In FIG. 4A, a voltage waveform We' as information of a back electromotive force when another rotary electrical machine 10 is driven mechanically is shown by a dashed line. In this example, the effective value corresponding to the voltage waveform We' is smaller than the effective value corresponding to the voltage waveform We. Accordingly, when each of these rotary electrical machines 10 is assembled with the drive apparatus 2 and operated, it is necessary to drive the latter based on a larger current value for outputting a rotational driving force of the same magnitude. When the effective value information E is thus obtained as the characteristic information C and stored in the storage medium 4, use of the effective value information E as the characteristic information C allows more precise control of the rotary electrical machine 10 when the drive apparatus 2 operates even when the rotary electrical machines 10 have individually different characteristics.

In the storage process S3, the position error information P and the characteristic information C obtained in the information obtaining process S2b are stored in the storage medium 4. In this embodiment, the client computer included in the inspection device 6 accesses the information management server 5 via the communication network 8, and writes the position error information P and the characteristic information C in the storage medium 4 together with the management information I via the host computer. Thus, these information are stored in the storage medium 4. At the point when the storage process S3 is finished, the drive apparatus 2 itself is completed, but the phase difference between the rotary electrical machine 10 and the resolver 20 due to an assembly error and the like as described above still remains. The drive apparatus 2 is transported to the second manufacturing line L2 in this state.

3-2. Manufacturing Processes on the Second Manufacturing Line

The manufacturing processes on the second manufacturing line L2 are mainly for assembling the drive apparatus 2 and the control device 3. In the reading process S4, the individual management information A including the position error information P and the characteristic information C are read from the storage medium 4 of the information management server 5 via the communication network 8. In this embodiment, the client computer included in the control information writing device 7 accesses the information management server 5 via the communication network 8, specifies the identification code of the rotary electrical machine 10 assembled with the drive apparatus 2, and obtains the individual management information A stored in association with the identification code of this rotary electrical machine 10 via the host computer. Here, in the storage medium 4 of the information management server 5, respective identification codes of the rotary electrical machines 10 are stored in a state of being included in the management information I. Accordingly, the position error information P with respect to a combination of the rotary electrical machine 10 and the resolver 20 included in the drive apparatus 2 supplied to the second manufacturing line L2 as well as the characteristic information C related to this rotary electrical machine 10 are read appropriately without any error.

In the writing process S5, the position error information P and the characteristic information C read in the reading process S4 are written in the control device 3 controlling the rotary electrical machine 10 included in the drive apparatus 2. In this embodiment, the control information writing device 7 writes the position error information P and the characteristic information C to a storage medium, such as a RAM or ROM, included in the control device 3. The control device 3 is then assembled with the rotary electrical machine 10 in the control device assembly process S6, in a state that the position error information P and the characteristic information C are written. By undergoing the above processes, a drive apparatus 2 is completed in a state that the phase difference between the rotary electrical machine 10 and the resolver 20 due to an assembly error and/or the like is electrically eliminated.

Specifically, in the drive apparatus 2 manufactured in this manner, the control device 3 corrects and uses an output signal of the resolver 20 based on the position error information P, thereby adjusting the phase difference between the rotary electrical machine 10 and the resolver 20. More particularly, in the control device 3, by the amount of the zero point error information Z obtained in the information obtaining process S2b, the zero point (reference point) position of the Z phase pulse waveform Wz from the resolver 20 is offset. Accordingly, the rotary electrical machine 10 and the resolver 20 become substantially completely in phase electrically, and thus the resolver 20 becomes capable of detecting the rotation position (rotation phase) of the rotor 11 of the rotary electrical machine 10 with high accuracy. Therefore, the rotation speed of the rotary electrical machine 10 can be controlled with high accuracy by the control device 3. Now, since the control device 3 is able to adjust the phase difference between the rotary electrical machine 10 and the resolver 20 electrically based on the received position error information P, it is unnecessary to adjust the attaching position of the resolver 20 mechanically, which allows to reduce the manufacturing time. Further, since no adjustment unit for performing such mechanical adjustment is needed, the manufacturing cost can be reduced.

Here, since the position error information P and the characteristic information C can be written in the storage medium 4 included in the information management server 5 from the inspection device 6 via the communication network 8, the position error information P and the characteristic information C obtained by the inspection device 6 when the inspection process S2 is carried out can be stored in the storage medium 4 easily and appropriately. Therefore, an operation of managing the position error information P and the characteristic information C with respect to a combination of the rotary electrical machine 10 and the resolver 20 in the inspection process S2 becomes simple, which allows cost reduction. Further, the position error information P and the characteristic information C stored thus in the storage medium 4 can be read by the control information writing device 7 via the communication network 8 when assembling the control device 3 with the rotary electrical machine 10, the position error information P and the characteristic information C can be obtained easily as necessary. Then the position error information P and the characteristic information C related to the drive apparatus 2 with which the control device 3 is assembled can be written in this control device 3 appropriately without error. Accordingly, when transporting, storing, or the like of the drive apparatus 2 and the control device 3 is performed, there is no need for special management operations to provide one-to-one correspondence between the drive apparatus 2 and the position error information P and so on of this drive apparatus 2 or the control device 3 in which this position error information P and so on are stored, and thus increase in cost does not happen. Therefore, the phase difference between the rotary electrical machine 10 and the resolver 20 can be adjusted easily at low cost.

Further, for example, when the drive apparatus 2 fails after the vehicle is shipped, the individual management information A (including the position error information P) corresponding to the new drive apparatus 2 is read from the storage medium 4 via the communication network 8, and the position error information P can be transferred to and overwritten in the control device 3. Further, for example, also when the control device 3 fails after the vehicle is shipped, the individual management information A (including the position error information P) corresponding to the drive apparatus 2 which is still normally operable can be read from the storage medium 4 via the communication network 8, and the position error information P can be transferred to and written in the new control device 3. Since the phase difference between the rotary electrical machine 10 and the resolver 20 can be adjusted in this manner, repair operations can also be facilitated.

Other Embodiments (1) The above-described embodiment has been described with an example in which the individual management information A stored in the storage medium 4 includes the zero point error information Z as the position error information P and the effective value information E as the characteristic information C. However, embodiments of the present invention are not limited thereto. Specifically, another preferred embodiment of the present invention is structured such that the individual management information A further includes, for example, information other than the position error information P and the characteristic information C. Further, another preferred embodiment of the present invention is structured such that the individual management information A further includes information other than the zero point error information Z as the position error information P and information other than the effective value information E as the characteristic information C. Further, another preferred embodiment of the present invention is structured such that the individual management information A includes only the zero point error information Z as the position error information P and do not include the effective value information E as the characteristic information C.

(2) The above-described embodiment has been described with an example in which the management information I included in the individual management information A stored in the storage medium 4 includes the identification code of the rotary electrical machine 10 provided in the drive apparatus 2. However, embodiments of the present invention are not limited thereto. Specifically, another preferred embodiment of the present invention is structured such that, when there is only one combination of the rotary electrical machine 10 and the resolver 20 for one drive apparatus 2 for example, the management information I includes the identification code of the drive apparatus 2 including this combination of the rotary electrical machine 10 and the resolver 20, and the control information writing device 7 obtains the necessary individual management information A based on this identification code of the drive apparatus 2.

(3) The above-described embodiment has been described with an example in which the system is structured to allow communication both between the inspection device 6 and the information management server 5 and between the information management server 5 and the control information writing device 7 via the communication network 8. However, embodiments of the present invention are not limited thereto. Specifically, another preferred embodiment of the present invention is structured to provide a communicable connection via a communication unit that performs one-to-one communication without forming a network, either or both between the inspection device 6 and the information management server 5 and between the information management server 5 and the control information writing device 7. Such communication unit that performs one-to-one communication includes both wired ones and wireless ones. Further, embodiments of the present invention are not limited to a system in which a connection via communication is provided both between the inspection device 6 and the information management server 5 and between the information management server 5 and the control information writing device 7. Specifically, as long as the individual management information A stored in the storage medium 4 is capable of being read via communication at least when the rotary electrical machine 10 and the control device 3 are assembled. For example, another preferred embodiment of the present invention is structured such that the inspection device 6 and the information management server 5 are not connected by communication. In this case, another preferred embodiment of the present invention is structured such that the position error information P and the characteristic information C obtained by the inspection device 6 are transmitted to the information management server 5 in a state of being stored in a storage medium such as a hard disk, a flash memory, a DVD-ROM, or a CD-ROM, for example.

(4) The above-described embodiment has been described with an example in which after the position error information P and the characteristic information C are written in the control device 3 in the writing process S5, the control device 3 with the position error information P and the characteristic information C being written therein is assembled with the rotary electrical machine 10 in the control device assembly process S6. However, embodiments of the present invention are not limited thereto. Specifically, the order of the writing process S5 and the control device assembly process S6 is arbitrary, and another preferred embodiment of the present invention is structured such that after the control device 3 is assembled with the rotary electrical machine 10, the position error information P and the characteristic information C are written in the storage medium, such as a RAM or ROM, included in this control device 3.

(5) The above-described embodiment has been described with an example in which the drive apparatus 2 is a drive apparatus for a hybrid vehicle including the rotary electrical machine 10. However, embodiments of the present invention are not limited thereto. Specifically, the present invention can be applied to a drive apparatus for a different type of vehicle such as an electric vehicle, and to various types of drive apparatuses for other than vehicles, for example, as long as the drive apparatuses include the rotary electrical machine 10 and the rotation sensor detecting a rotation position of the rotor 11 of the rotary electrical machine 10.

The present invention may be preferably applied to an information management system for a drive apparatus including a rotary electrical machine and a rotation sensor detecting a rotation position of a rotor of the rotary electrical machine, and a method of manufacturing such a drive apparatus.

What is claimed is:

1. An information management system for a drive apparatus including a rotary electrical machine and a rotation sensor detecting a rotation position of a rotor of the rotary electrical machine, the information management system comprising:
   a storage medium storing an identification code of the rotary electrical machine and position error information of the rotation sensor obtained based on information of the back electromotive force and output information from the rotation sensor in an inspection process in which a back electromotive force is measured by mechanically driving the rotary electrical machine after the rotary electrical machine and the rotation sensor are assembled, wherein
   the storage medium is provided in a state capable of reading the position error information via communication based on the identification code, and
   the storage medium is provided in a state capable of being read via communication when a control device controlling the rotary electrical machine is assembled with the rotary electrical machine.

2. The information management system for the drive apparatus according to claim 1, wherein
   the position error information is information of a difference between a reference point of a voltage waveform as the information of the back electromotive force and a reference point of a pulse signal as the output information from the rotation sensor.

3. The information management system for the drive apparatus according to claim 1, wherein
   in the inspection process, characteristic information of the rotary electrical machine is further obtained based on the information of the back electromotive force when the rotary electrical machine is mechanically driven, and
   the storage medium further stores the characteristic information.

4. The information management system for the drive apparatus according to claim 3, wherein
   the inspection process includes a process of measuring an effective value of a voltage waveform as information of the back electromotive force, and the characteristic information of the rotary electrical machine includes information of the effective value of the voltage waveform.

5. The information management system for the drive apparatus according to claim 1, further comprising:
   an information management server including the storage medium, wherein
   the information management server is structured to be capable of communicating with a control information writing device which writes the position error information in the control device when the control device is assembled with the rotary electrical machine, and
   the storage medium is in a state capable of being read by the control information writing device via communication.

6. The information management system for the drive apparatus according to claim 5, wherein
   the information management server is further structured to be capable of communicating with an inspection device which performs the inspection process, and the position error information obtained by the inspection device is capable of being written in the storage medium via communication.

7. The information management system for the drive apparatus according to claim 2, wherein
   in the inspection process, characteristic information of the rotary electrical machine is further obtained based on the information of the back electromotive force when the rotary electrical machine is mechanically driven, and
   the storage medium further stores the characteristic information.

8. The information management system for the drive apparatus according to claim 7, wherein
   the inspection process includes a process of measuring an effective value of a voltage waveform as information of the back electromotive force, and the characteristic information of the rotary electrical machine includes information of the effective value of the voltage waveform.

9. The information management system for the drive apparatus according to claim 2, further comprising:
   an information management server including the storage medium, wherein
   the information management server is structured to be capable of communicating with a control information writing device which writes the position error information in the control device when the control device is assembled with the rotary electrical machine, and
   the storage medium is in a state capable of being read by the control information writing device via communication.

10. The information management system for the drive apparatus according to claim 3, further comprising:
    an information management server including the storage medium, wherein
    the information management server is structured to be capable of communicating with a control information writing device which writes the position error information in the control device when the control device is assembled with the rotary electrical machine, and
    the storage medium is in a state capable of being read by the control information writing device via communication.

11. The information management system for the drive apparatus according to claim 7, further comprising:
    an information management server including the storage medium, wherein the information management server is structured to be capable of communicating with a control information writing device which writes the position error information in the control device when the control device is assembled with the rotary electrical machine, and the storage medium is in a state capable of being read by the control information writing device via communication.

12. The information management system for the drive apparatus according to claim 4, further comprising:

an information management server including the storage medium, wherein the information management server is structured to be capable of communicating with a control information writing device which writes the position error information in the control device when the control device is assembled with the rotary electrical machine, and the storage medium is in a state capable of being read by the control information writing device via communication.

13. The information management system for the drive apparatus according to claim 8, further comprising:

an information management server including the storage medium, wherein the information management server is structured to be capable of communicating with a control information writing device which writes the position error information in the control device when the control device is assembled with the rotary electrical machine, and the storage medium is in a state capable of being read by the control information writing device via communication.

14. The information management system for the drive apparatus according to claim 9, wherein the information management server is further structured to be capable of communicating with an inspection device which performs the inspection process, and the position error information obtained by the inspection device is capable of being written in the storage medium via communication.

15. The information management system for the drive apparatus according to claim 10, wherein the information management server is further structured to be capable of communicating with an inspection device which performs the inspection process, and the position error information obtained by the inspection device is capable of being written in the storage medium via communication.

16. The information management system for the drive apparatus according to claim 11, wherein the information management server is further structured to be capable of communicating with an inspection device which performs the inspection process, and the position error information obtained by the inspection device is capable of being written in the storage medium via communication.

17. The information management system for the drive apparatus according to claim 13, wherein the information management server is further structured to be capable of communicating with an inspection device which performs the inspection process, and the position error information obtained by the inspection device is capable of being written in the storage medium via communication.

18. A method of manufacturing a drive apparatus comprising a rotary electrical machine and a rotation sensor detecting a rotation position of a rotor of the rotary electrical machine, the method comprising:

first assembling the rotary electrical machine with the rotation sensor;

measuring a back electromotive force by mechanically driving the rotary electrical machine;

obtaining position error information of the rotation sensor based on information of the back electromotive force and output information from the rotation sensor;

storing the position error information and an identification code of the rotary electrical machine in a storage medium;

reading the position error information from the storage medium via communication based on the identification code;

writing the position error information read in the reading into a control device which controls the rotary electrical machine; and second assembling the control device with the rotary electrical machine.

* * * * *